United States Patent
Weldon et al.

(10) Patent No.: US 8,814,181 B1
(45) Date of Patent: Aug. 26, 2014

(54) CART APPARATUS FOR TRANSPORTING CARGO ITEMS TO AND FROM A RECREATIONAL LOCATION

(71) Applicant: Hickory Springs Manufacturing Company, Hickory, NC (US)

(72) Inventors: Paul Weldon, West Chester, PA (US); Jeryldene Weldon, West Chester, PA (US); Julie Weldon, Mt. Pleasant, SC (US); John Saladino, Charlotte, NC (US); Rapier James, Purlear, NC (US); James Tate, Hickory, NC (US); Robert Gibson, Charlotte, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 0 days.

(21) Appl. No.: 13/758,529

(22) Filed: Feb. 4, 2013

(51) Int. Cl.
  *B62B 1/04* (2006.01)
  *B62B 3/02* (2006.01)

(52) U.S. Cl.
  CPC .................................. *B62B 3/02* (2013.01)
  USPC ............. 280/30; 280/35; 280/47.18; 297/129

(58) Field of Classification Search
  CPC ............. B62B 1/12; B62B 1/14; B62B 3/02; B62B 3/04; B62B 5/0083; B62B 2202/32; B62B 2206/00; A47C 1/14; A47C 13/00
  USPC .................. 280/35, 639, 651, 652, 659, 43.1, 280/43.12, 47.27, 47.29, 30, 47.18; 297/31, 297/118, 129, 183.5, 183.6, 183.7
  See application file for complete search history.

(56) References Cited

U.S. PATENT DOCUMENTS

| | | | |
|---|---|---|---|
| 3,930,662 A | 1/1976 | Manner | |
| 4,316,615 A | 2/1982 | Willette | |
| 4,645,262 A | 2/1987 | Furubotten | |
| 4,934,719 A | 6/1990 | duPont | |
| 5,356,197 A * | 10/1994 | Simic | 297/129 |
| 5,362,079 A | 11/1994 | Graham | |
| 5,492,347 A * | 2/1996 | Palmeri et al. | 280/47.131 |
| 5,542,740 A | 8/1996 | Chang | |
| 5,669,659 A | 9/1997 | Dittmer | |
| 5,772,223 A | 6/1998 | Letourneau | |
| D403,827 S * | 1/1999 | Smoker | D34/24 |
| 5,988,737 A | 11/1999 | Tomaiuolo | |
| 6,003,883 A | 12/1999 | Brenneman | |
| 6,048,037 A | 4/2000 | Cheng | |
| 6,113,129 A | 9/2000 | Marques et al. | |
| 6,131,925 A | 10/2000 | Weldon | |
| 6,196,560 B1 * | 3/2001 | Ohlsson | 280/30 |

(Continued)

*Primary Examiner* — John Walters
(74) *Attorney, Agent, or Firm* — Nelson Mullins Riley & Scarborough LLP

(57) ABSTRACT

A cart apparatus for transporting cargo items to and from a recreational location includes a base unit and a chair unit which are selectively assemblable for transport and disassemblable upon reaching a desired destination. The base unit includes wheels for rolling over varying terrains, and a support portion for stowage thereon of cargo items. The chair unit is foldable between collapsed and opened conditions. The base unit is formed with a receiving area for selective receipt of the collapsed chair unit. When assembled, the collapsed chair unit is matedly engaged in the receiving area of the base unit with the chair unit extending outwardly from the base unit to serve as a handle for controlling rolling and tilting operation of the base unit. When disassembled, the chair unit may be opened into the use condition, and the base unit may serve as a side table.

16 Claims, 4 Drawing Sheets

(56) References Cited

U.S. PATENT DOCUMENTS 6,789,809 B2    9/2004   Lin
6,988,737 B1    1/2006   Clark
7,703,795 B2    4/2010   Williamson
8,297,642 B2   10/2012   Tyson, III

* cited by examiner

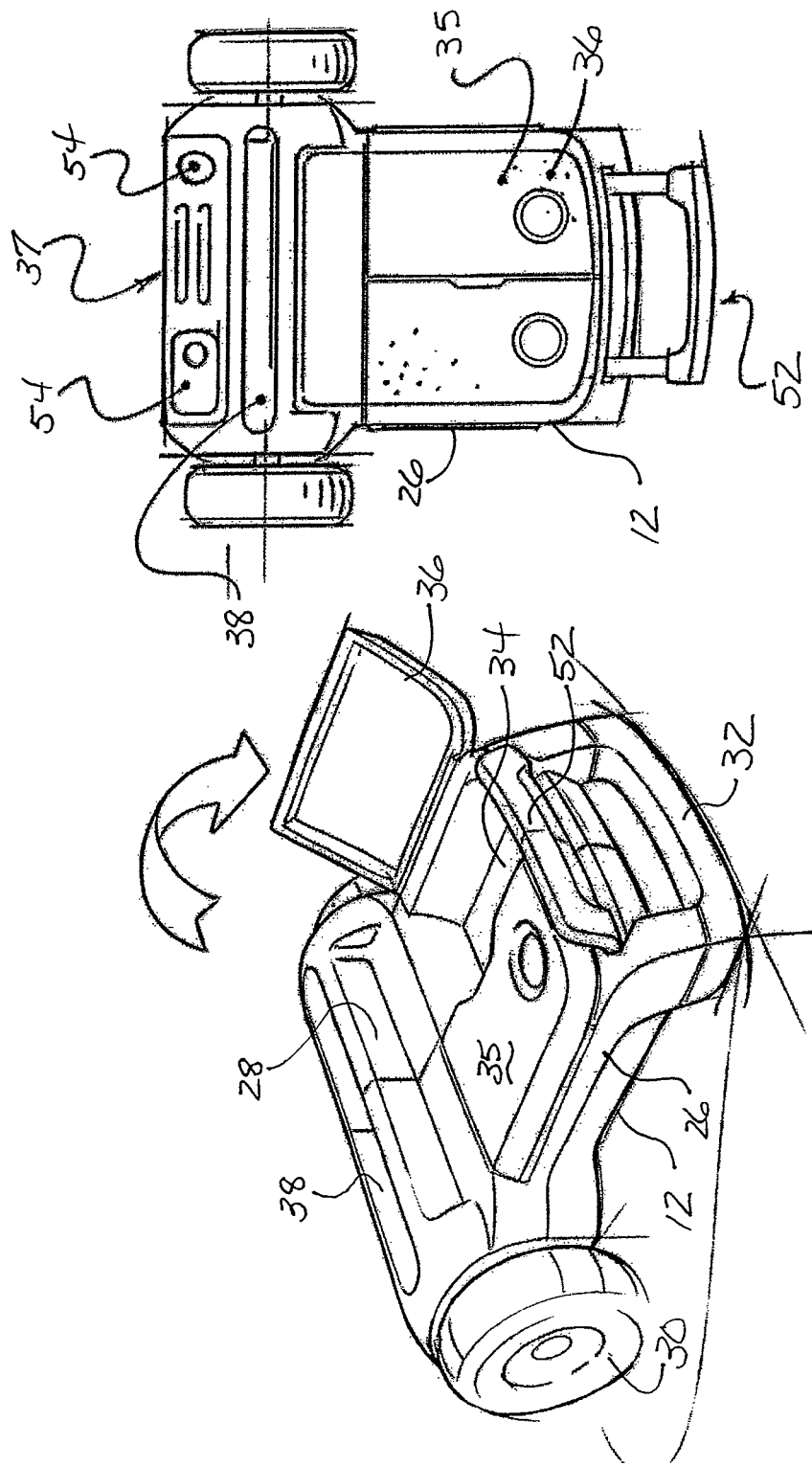

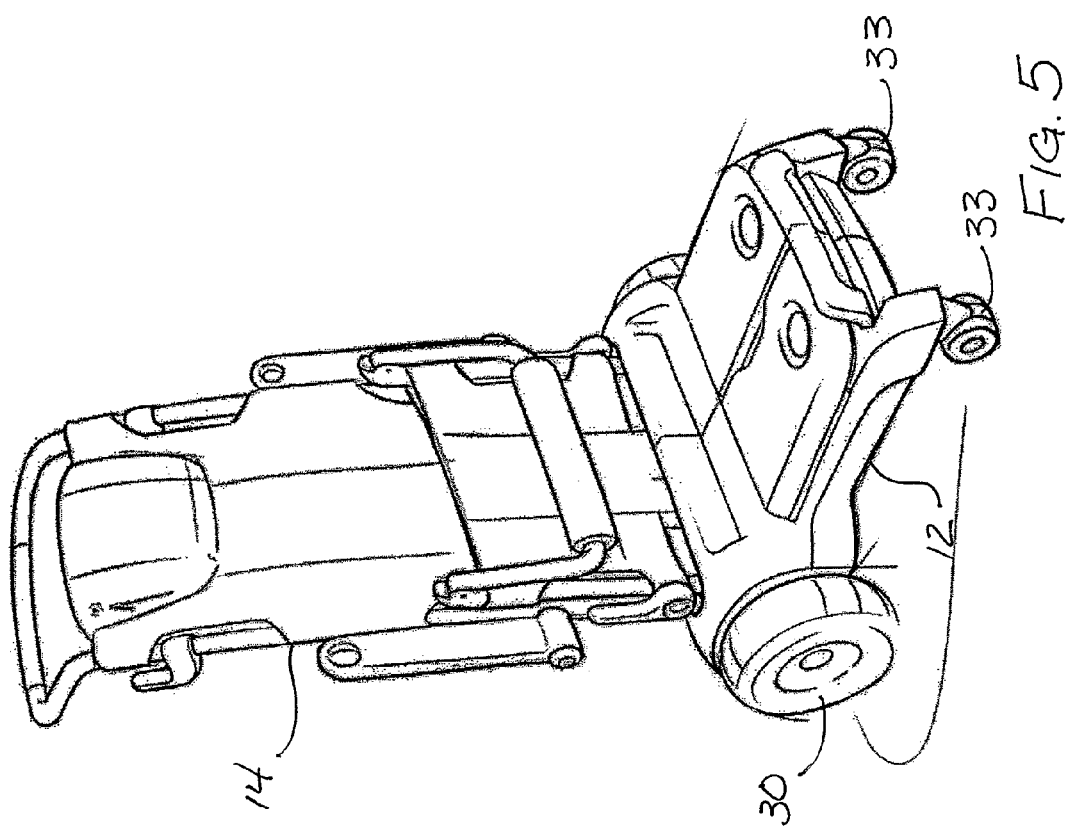

CART APPARATUS FOR TRANSPORTING CARGO ITEMS TO AND FROM A RECREATIONAL LOCATION

FIELD OF THE INVENTION

The present invention relates generally to manually operable carts and like wheeled devices adapted for transporting cargo and various paraphernalia from one location to another. More particularly, the present invention relates to such cart structures designed and intended for transporting recreational cargo items to and from a recreational location, especially for example but not limited to beachfront areas.

BACKGROUND OF THE INVENTION

Coastal beachfront areas are one of the most popular and commonplace vacation and recreational destinations worldwide, especially along the coastal areas of the United States. Because direct beachfront access to such areas is necessarily limited, it is typical for beachgoers to have to walk not insignificant distances to reach a public beach access point. For that reason, many beachgoers choose to spend the majority of an entire day at the beach, as walking back and forth to and from an off-beach hotel, home or parking location may be extremely inconvenient. On the other hand, to conveniently spend an extended period of time at the beach generally necessitates that a not insignificant amount of personal, convenience and recreational items, e.g., chairs, towels, umbrellas, coolers, books or other reading materials, sports items, etc., need to be transported to the beach and then transported back from the beach.

The need for some sort of transport cart or other apparatus to assist in carrying and moving such items of cargo to and from the beach is well recognized, and many differing types of apparatus and devices, ranging from wheeled devices such as wagons or carts, to trailers and the like which can be pulled by a bicycle, have been proposed to facilitate the transport of such items. To date, however, these devices and apparatus have met with little or no commercial acceptance. Despite all such attempts to develop a transport device with mass appeal and functionality, it remains commonplace for beachgoers to simply manually carry items to and from the beach, often necessitating multiple trips to bring all desired items to the beach.

SUMMARY OF THE INVENTION

It is accordingly an object of the present invention to provide a novel apparatus that will enable one person to conveniently transport numerous cargo items to and from a recreational area. A more particular object of the present invention is to provide such an apparatus which is particularly adapted for transporting beach paraphernalia, e.g., a chair or chairs, food and beverage items, personal and convenience items such as towels and reading materials, and sports or recreational items. A further object of the present invention is to provide such an apparatus with multiple and convertible functionality. Still further objects and advantages of the present invention will be apparent from the following disclosure.

Briefly summarized, the present invention contemplates a cart apparatus for transporting cargo items to and from a recreational location, comprised in combination of a base unit and a chair unit which are selectively assemblable for transport and disassemblable for other use upon reaching a desired destination. The base unit includes wheels configured for rolling transport over varying terrains, and a support portion for stowage thereon of cargo items. The chair unit is foldable between a collapsed transport condition and an opened use condition. When in the collapsed condition, the chair unit presents a mounting portion at one end thereof and a handle portion at an opposite end thereof. The base unit is formed with a receiving area configured for selective mated receipt of the chair unit with the base unit in an assembled condition thereof and selective removal of the chair unit from the base unit in a disassembled condition thereof. More particularly, in the assembled condition, the mounting portion of the collapsed chair unit is matedly engaged in the receiving area of the base unit with the chair unit extending outwardly from the base unit with the handle portion accessible for use of the chair unit as a handle for controlling rolling and tilting operation of the base unit. In the disassembled condition, the chair unit is fully separated from the base unit such that the chair unit may be opened into the use condition.

In a contemplated embodiment, the chair unit is held relatively rigid with respect to the base unit in the assembled condition of the base unit and the chair unit, with the chair unit in generally upstanding disposition relative to the base unit. The receiving area of the base unit is preferably disposed adjacent the wheels to better facilitate use of the collapsed chair unit as an operating handle. It is further preferred that the base unit is of a configuration to facilitate use as a table with the support surface as a table top surface when in the disassembled condition of the base unit and the chair unit. An additional contemplated feature for the present cart apparatus is that the base unit is provided with at least one openable and closable interior storage compartment, which may be insulated for storage of chilled or heated beverages or food.

The base unit may also include a foot portion spaced from the wheels such that the wheels and the foot portion are cooperative for supporting the base unit in a stationary parked position. Alternatively, the base unit may include auxiliary wheels spaced from the first-mentioned wheels such that the first-mentioned wheels and the auxiliary wheels are cooperative for rolling movement of the base unit and for supporting the base unit in a stationary parked position. The foot portion may be selectively removable from the base unit and selectively replaceable with auxiliary wheels.

The base unit may also be equipped with an auxiliary support portion which is selectively extendable and retractable relative to the first-mentioned support portion for selectively expanding the capacity of the base unit for stowage of cargo items thereon. The base unit may also be formed with one or more receptors configured for mated receipt of a designated cargo item, e.g., an umbrella, a container, etc.

The apparatus may also include a net configured for selective attachment to and detachment from the base unit and the chair unit in the assembled condition thereof for securement of cargo items thereon.

BRIEF DESCRIPTION OF THE DRAWINGS

FIG. 2 is a perspective view of the base unit, in opened condition;

FIG. 3 is a top plan view of the base unit;

FIG. 5 is a perspective view of an alternative embodiment of the cart apparatus.

DETAILED DESCRIPTION OF THE PREFERRED EMBODIMENTS

Figure 1:
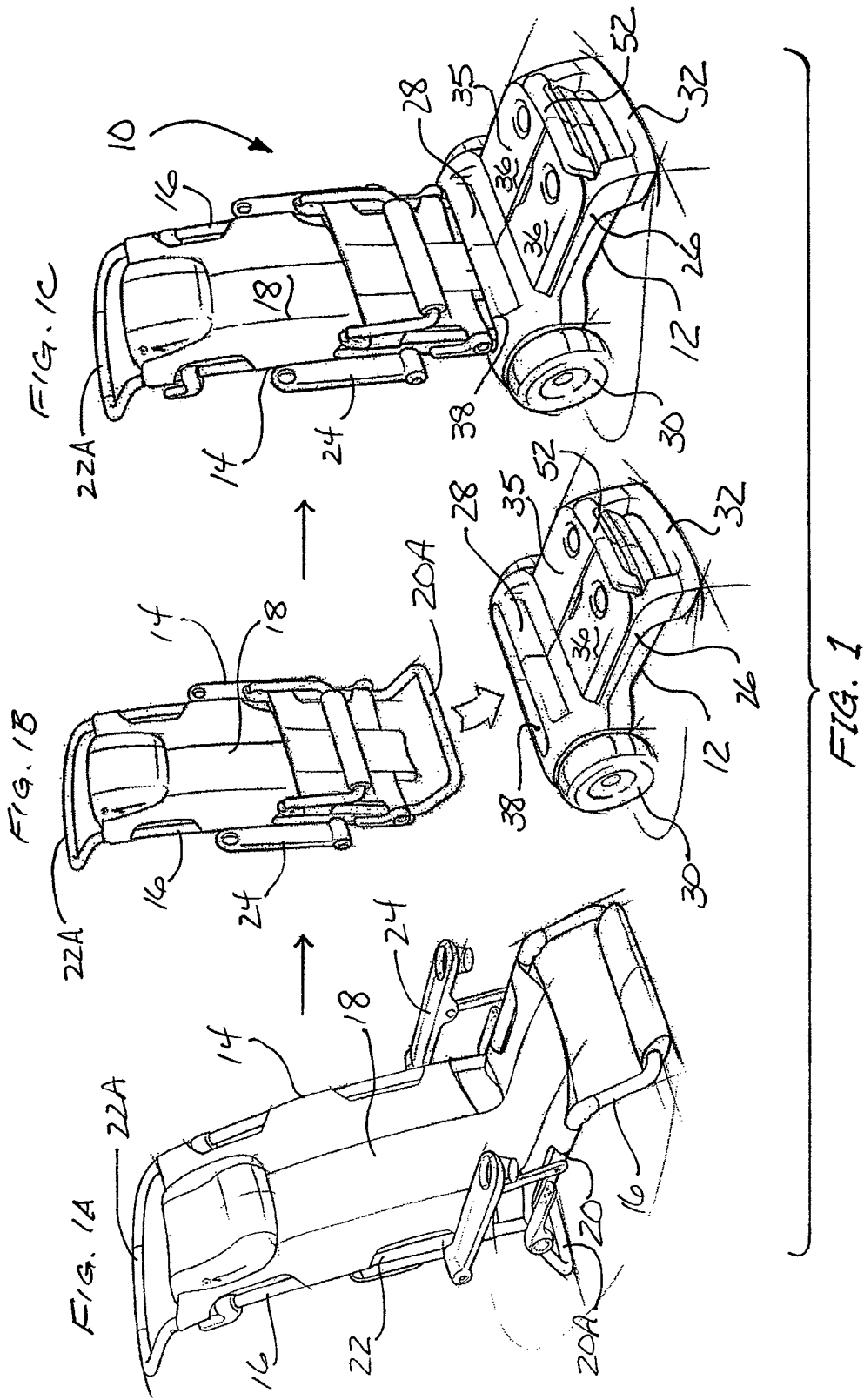
FIG. 1 is a series of perspective views 1A, 1B and 1C depicting the constituent base and chair units of the present cart apparatus individually and in sequence of assembly.

Referring now to the accompanying drawings and initially to FIG. 1, a cart apparatus in accordance with the present invention is indicated overall at 10 and basically comprises a base unit 12 and a chair unit 14 which are selectively assemblable for transport and disassemblable for other use upon reaching a desired destination.

The chair unit 14 is preferably a folding lounge-type outdoor chair, often commonly referred to as a beach chair or lawn chair, basically comprising a tubular skeletal framework 16 supporting a fabric skin 18. The framework 16 is preferably fabricated of a corrosion resistant material, such as aluminum or alternatively plastic, and includes a seat base subframe 20 and a back subframe 22 pivoted together for convenient folding between an opened unfolded use condition, depicted in FIG. 1A and a collapsed condition, depicted in FIG. 1B. As depicted in FIG. 1A, the framework 16 may also include a pair of armrests 24, connected between the seat base and back subframes 20, 22.

In the opened unfolded use condition, the seat base subframe 20 extends horizontally to rest on a support surface, often bare ground, and the back subframe 22 extends away from the seat base subframe 20. Preferably, the pivot connection between the seat base and back subframes 20, 22 permits the back subframe 22 to be selectively oriented in several different angular relationships to the seat base subframe 20 ranging between a fully upright chair position angled relative to the seat base subframe 20 (shown in FIG. 1A) and a fully reclined position substantially aligned with the seat base subframe 20 (not shown). In the collapsed condition, the seat base and back subframes 20, 22 are pivoted toward one another into adjacent overlying nested relationship forming a relatively flat overall unit, as depicted in FIG. 1B. In such collapsed condition, one end portion 20A of the seat base subframe 20 and one end portion 22A of the back subframe 22 are disposed at and define opposite ends of the collapsed chair unit 14.

The basic chair unit 14 as above-described is generally conventional, with various versions thereof commercially available. For purposes of the cart apparatus of the present invention, various of the known commercial chairs of this type may be suitable for use in the present cart apparatus and, in turn, it is to be expressly understood that the present invention is not limited to any specific chair unit so long as the basic structural features described herein are met.

The base unit 12 comprises a main body 26 formed with an enlarged receiving housing 28 at one end of the body to opposite sides of which a pair of rotatable wheels 30 are mounted and a downwardly projecting foot portion 32 at the opposite end of the body, whereby the wheels and the foot portion 32 cooperate to provide a stable base for supporting the base unit 12 in a stationary parked position horizontally on various support surfaces, especially bare ground. The wheels 30 are preferably of an enlarged diameter and axial width to facilitate rolling movement over various surfaces and terrains, especially sand. The main body 26 is also preferably fabricated of a corrosion resistant material, such as by molding of a thermoplastic material.

The upwardly facing surface 35 of the main body 26 is preferably flat to provide a support on which various articles may be rested for transport on the cart apparatus, as more fully described hereinafter. The main body 26 may also advantageously be formed of a hollow configuration to provide an open interior storage area 34 (see FIG. 2) with pivoting doors 36 for opening and closing the storage area 34. For example, the main body 26 may be provided with insulative material surrounding the storage area 34 to facilitate storage of chilled or heated food, beverages and the like.

According to a particular feature of the present invention, the receiving housing 28 of the main body 26 of the base unit 12 is formed to define an upwardly-open slotted receiving area 38 sized and configured compatibly to the end portion 20A of the seat base subframe 20. In this manner, when the chair unit 14 is folded into its collapsed condition, the seat base subframe end portion 20A serves as a mounting portion which may be inserted into the slotted receiving area 38 to fit snugly therein and thereby secure the chair unit 14 rigidly with respect to the base unit 12, as depicted by FIGS. 1B and 1C. With the chair unit 14 thusly secured to the base unit 12, the collapsed extent of the chair unit 14 extends in an upstanding manner from the base unit 12, with the end portion 22A of the back subframe 22 disposed uppermost and in disposition to serve as a handle portion by which movements of the assembled base and chair units 12, 14 may be initiated and controlled, specifically, tilting movement of the assembly onto the wheels 30 and rolling movement of the assembly on the wheels 30. A foot step surface 37 may be formed on the main body 26 between the wheels 30 to enable a user to conveniently initiate tilting of the cart apparatus 10.

Figure 4:
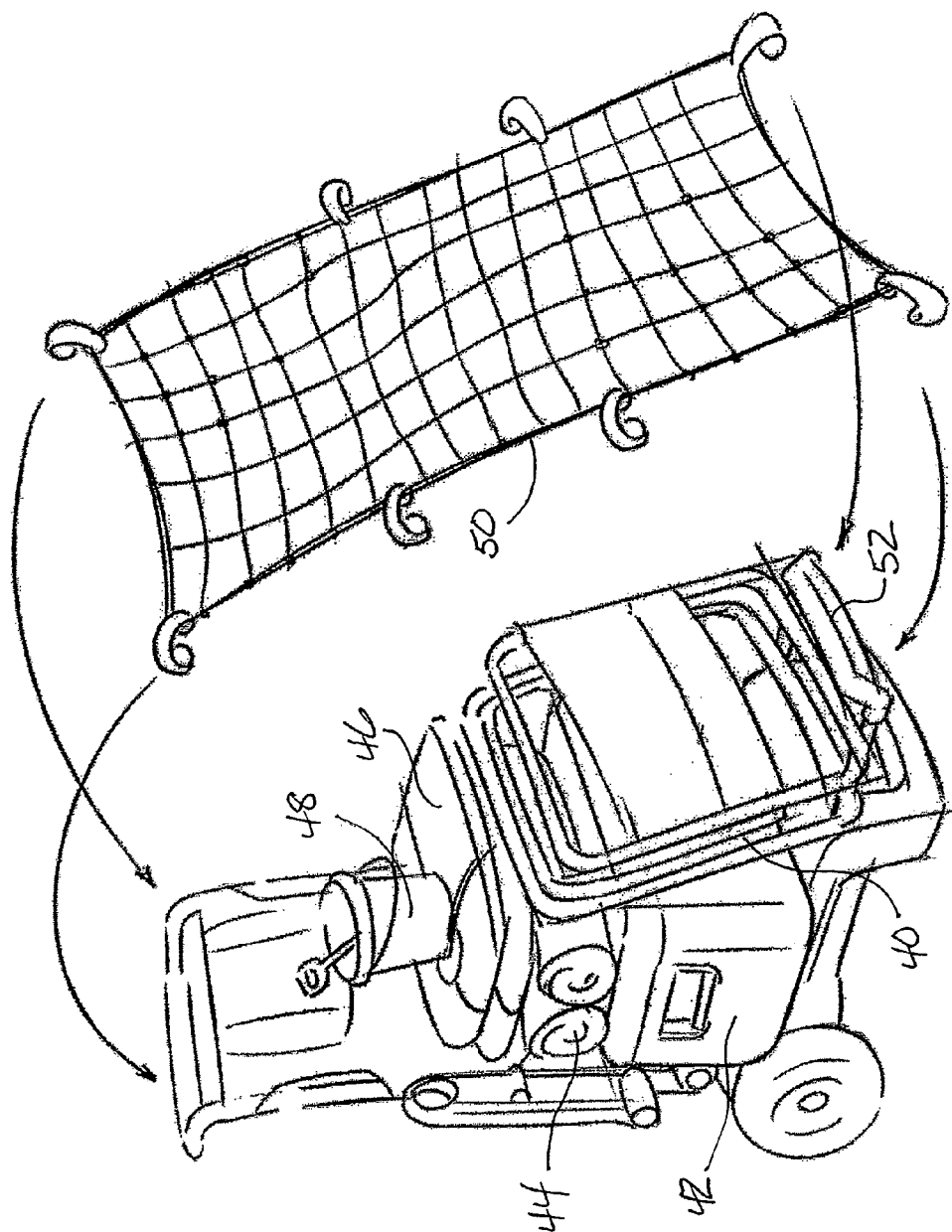
FIG. 4 is a perspective view of the cart apparatus in representative usage.

With the chair unit 14 rigidly secured to the base unit 12 as above-described, the assembled cart apparatus 10 under the operation of a single person is capable of transporting a relatively significant volume and weight of diverse items, much more than a single person could otherwise carry alone. As representatively depicted in FIG. 4, additional chairs 40, one or more coolers 42, beach towels 44, typical beach recreational items such as boogie boards 46 and sand shovels and buckets 48, or any other various items, may be rested on and secured to the upwardly facing support surface 35 of the base unit main body 26, for example by a cargo net 50 or other securement devices, e.g., bungee cords or the like.

To expand and optimize the storage capacity of the cart apparatus 10, the base unit 12 may be additionally equipped with an auxiliary support member, such as an auxiliary support arm 52 extendable and retractable with respect to the main body 26. It is further contemplated that the main body 26 of the base unit 12 may be formed with additional receptor recesses 54, as depicted in FIG. 3, specially sized and configured to receive other commonplace items such as a beach umbrella, one or more water containers, etc.

It is also contemplated that additional wheels 33, e.g., in the form of casters, may be provided on the main body 26 instead of the foot portion 32, as depicted in FIG. 5, to facilitate rolling movement of the cart apparatus 10 without the need to tilt the base unit 12 on the wheels 30 to elevate the foot portion 32. To enable selective operation of the cart apparatus 10 with either the foot portion 32 or additional wheels 33, the main body 26 of the base unit 12 may be configured for selective attachment and detachment of the foot portion 32 and the wheels 33 for selective interchangeability thereof.

Upon reaching a destination with the cart apparatus 10 loaded with cargo items, and following unloading of the cargo items, the chair unit 14 may be removed from the base unit 12 and opened into its use condition. The base unit 12 may then advantageously serve as a side table to the chair unit 14, with the upwardly facing surface 35 providing a convenient tabletop surface, and also permitting ready access to any items stored within the interior storage area 34.

As will thusly be understood, the cart apparatus 10 of the present invention provides widely flexible and convenient storage and transport capabilities for numerous and diverse cargo items, and can be easily loaded, transported and unloaded by a single person. The cart apparatus 10 is contemplated to be ideally suited for transporting items to and from a beach area, but will be readily recognized to be equally adapted and useful in any of various other circumstances, e.g., picnics, family reunions, or any other outings which necessitate the transport of multiple items. The cart apparatus 10 thusly fulfills a substantial need which has existed for a long period of time and, despite numerous attempts by other parties, has not previously been satisfactorily met.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof

What is claimed is:

1. A cart apparatus for transporting cargo items to and from a recreational location, the cart apparatus comprising in combination:
   a base unit having wheels configured for rolling transport over varying terrains, and a support portion for stowage thereon of cargo items,
   a chair unit foldable between a collapsed transport condition and an opened use condition, the chair unit when in the collapsed condition presenting a mounting portion at one end thereof and a handle portion at an opposite end thereof,
   the base unit being formed with a receiving area configured for selective mated receipt of the chair unit with the base unit in an assembled condition thereof and selective removal of the chair unit from the base unit in a disassembled condition thereof,
   wherein in the assembled condition, the mounting portion of the chair unit in the collapsed condition is matedly engaged in the receiving area of the base unit with the chair unit extending outwardly from the base unit with the handle portion accessible for use of the chair unit as a handle for controlling rolling and tilting operation of the base unit, and
   wherein in the disassembled condition, the chair unit is fully separated from the base unit such that the chair unit may be opened into the use condition.

2. A cart apparatus for transporting cargo items to and from a recreational location according to claim 1, wherein in the assembled condition of the base unit and the chair unit, the chair unit is held rigidly with respect to the base unit.

3. A cart apparatus for transporting cargo items to and from a recreational location according to claim 1 or 2, wherein in the assembled condition of the base unit and the chair unit, the chair unit is held in generally upstanding disposition relative to the base unit.

4. A cart apparatus for transporting cargo items to and from a recreational location according to claim 1, wherein the receiving area of the base unit is disposed adjacent the wheels.

5. A cart apparatus for transporting cargo items to and from a recreational location according to claim 1, wherein in the disassembled condition of the base unit and the chair unit, the base unit is usable as a table with the support surface as a table top surface.

6. A cart apparatus for transporting cargo items to and from a recreational location according to claim 1, wherein the base unit comprises at least one openable and closable interior storage compartment.

7. A cart apparatus for transporting cargo items to and from a recreational location according to claim 1, wherein the storage compartment in the base unit is insulated for storage of chilled or heated beverages or food.

8. A cart apparatus for transporting cargo items to and from a recreational location according to claim 1, wherein the base unit comprises a foot portion spaced from the wheels, wherein the wheels and the foot portion are cooperative for supporting the base unit in a stationary parked position.

9. A cart apparatus for transporting cargo items to and from a recreational location according to claim 1 or 8, wherein the base unit comprises auxiliary wheels spaced from the first-mentioned wheels, wherein the first-mentioned wheels and the auxiliary wheels are cooperative for rolling movement of the base unit and for supporting the base unit in a stationary parked position.

10. A cart apparatus for transporting cargo items to and from a recreational location according to claim 8, wherein the foot portion is selectively removable from the base unit and selectively replaceable with auxiliary wheels.

11. A cart apparatus for transporting cargo items to and from a recreational location according to claim 1, wherein the base unit comprises an auxiliary support portion selectively extendable and retractable relative to the first-mentioned support portion for selectively expanding the capacity of the base unit for stowage of cargo items.

12. A cart apparatus for transporting cargo items to and from a recreational location according to claim 1, wherein the base unit comprises at least one receptor configured for mated receipt of a designated cargo item.

13. A cart apparatus for transporting cargo items to and from a recreational location according to claim 12, wherein the receptor is configured to receive an umbrella.

14. A cart apparatus for transporting cargo items to and from a recreational location according to claim 12, wherein the receptor is configured to receive a container.

15. A cart apparatus for transporting cargo items to and from a recreational location according to claim 1, further comprising a net configured for selective attachment to and detachment from the base unit and the chair unit in the assembled condition thereof for securement of cargo items thereon.

16. A cart apparatus for transporting cargo items to and from a recreational location, the cart apparatus comprising in combination:
   a base unit having wheels configured for rolling transport over varying terrains, a support portion for stowage thereon of cargo items, and at least one openable and closable interior storage compartment,
   a chair unit foldable between a collapsed transport condition and an opened use condition, the chair unit when in the collapsed condition presenting a mounting portion at one end thereof and a handle portion at an opposite end thereof,
   the base unit being formed with a receiving area adjacent the wheels, the receiving area being configured for selective mated receipt of the chair unit with the base unit in an assembled condition thereof and selective removal of the chair unit from the base unit in a disassembled condition thereof, wherein in the assembled condition, the mounting portion of the chair unit in the collapsed condition is matedly engaged in the receiving area of the base unit relatively rigidly with respect to the base unit and with the chair unit extending in generally upstanding disposition from the base unit with the handle portion accessible for use of the chair unit as a handle for controlling rolling and tilting operation of the base unit, and wherein in the disassembled condition, the base unit is usable as a table with the support surface as a table top surface and the chair unit is fully separated from the base unit such that the chair unit may be opened into the use condition.

\* \* \* \* \*